United States Patent
Cowgill et al.

(10) Patent No.: US 9,303,553 B2
(45) Date of Patent: Apr. 5, 2016

(54) TURBO SPEED CONTROL FOR MODE TRANSITIONS IN A DUAL TURBO SYSTEM

(71) Applicant: GM Global Technology Operations LLC, Detroit, MI (US)

(72) Inventors: Joshua D. Cowgill, Hartland, MI (US); Joel Cowgill, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 241 days.

(21) Appl. No.: 14/097,587

(22) Filed: Dec. 5, 2013

(65) Prior Publication Data

US 2015/0159544 A1   Jun. 11, 2015

(51) Int. Cl.

| | | |
|---|---|---|
| *F02D 23/00* | (2006.01) | |
| *F02B 33/44* | (2006.01) | |
| *F02B 33/00* | (2006.01) | |
| *F02B 37/00* | (2006.01) | |
| *F02B 37/16* | (2006.01) | |
| *F02B 37/18* | (2006.01) | |
| *F02B 37/22* | (2006.01) | |
| *F02B 37/12* | (2006.01) | |

(52) U.S. Cl.
CPC ............... *F02B 37/002* (2013.01); *F02B 37/16* (2013.01); *F02B 37/18* (2013.01); *F02B 37/183* (2013.01); *F02B 37/22* (2013.01); *F02B 2037/122* (2013.01); *F02B 2037/162* (2013.01)

(58) Field of Classification Search
CPC ...... F02B 37/002; F02B 37/12; F02B 37/127; F02B 37/16; F02B 37/007; F02B 37/22; F02M 25/0707; F02M 25/0711; F02M 25/0713; F01N 13/107; F01N 2240/36; F02D 9/04; F02D 23/00; F02D 41/0007; F02D 2200/0414; F02D 2200/0416; F02D 2041/2027; Y02T 10/144
USPC ..................... 60/602, 605.1, 605.2, 611, 612; 123/562, 568.12; 701/102–105, 108
See application file for complete search history.

(56) References Cited

U.S. PATENT DOCUMENTS

| | | | | |
|---|---|---|---|---|
| 2,773,348 A | * | 12/1956 | Grieshaber et al. ............. | 60/612 |
| 4,781,027 A | * | 11/1988 | Richter et al. .................. | 60/612 |

(Continued)

FOREIGN PATENT DOCUMENTS

| | | | | | |
|---|---|---|---|---|---|
| DE | 102006042443 A1 | * | 3/2008 | .............. | F02B 37/22 |
| DE | 102006061345 A1 | * | 4/2008 | ............ | F02B 37/007 |

(Continued)

OTHER PUBLICATIONS

U.S. Appl. No. 14/097,665, filed Dec. 5, 2013, Joshua D. Cowgill.

*Primary Examiner* — Thai Ba Trieu

(57) ABSTRACT

A system for controlling an engine having a first turbocharger, a second turbocharger and a cutoff valve that regulates exhaust flow through a turbine of the second turbocharger, the system comprising: a speed determination module that determines a current speed of the first turbocharger, determines a current speed of the second turbocharger, and determines a target speed of the second turbocharger based on the current speed of the first turbocharger; and a boost control module that compares the target speed of the second turbocharger with the current speed of the second turbocharger, and that selectively adjusts a position of a cutoff valve to adjust the current speed of the second turbocharger based on the comparison.

25 Claims, 4 Drawing Sheets

(56) References Cited

U.S. PATENT DOCUMENTS

| | | | |
|---|---|---|---|
| 5,003,781 A * | 4/1991 | Shibata et al. | 60/612 |
| 5,005,359 A * | 4/1991 | Tashima et al. | 60/612 |
| 5,035,114 A * | 7/1991 | Shibata et al. | 60/612 |
| 5,036,663 A * | 8/1991 | Akagi et al. | 60/612 |
| 5,081,842 A * | 1/1992 | Sugiyama et al. | 60/612 |
| 5,083,543 A * | 1/1992 | Harada et al. | 60/612 |
| 5,144,803 A * | 9/1992 | Yoshioka et al. | 60/612 |
| 5,154,057 A * | 10/1992 | Yoshioka et al. | 60/612 |
| 5,154,058 A * | 10/1992 | Mizuno | 60/612 |
| 5,168,707 A * | 12/1992 | Yoshioka et al. | 60/612 |
| 5,186,005 A * | 2/1993 | Yoshioka et al. | 60/612 |
| 5,197,287 A * | 3/1993 | Okimoto et al. | 60/612 |
| 5,289,684 A * | 3/1994 | Yoshioka et al. | 60/612 |
| 5,313,798 A * | 5/1994 | Yoshioka et al. | 60/612 |
| 5,351,486 A * | 10/1994 | Yoshioka et al. | 60/612 |
| 7,895,838 B2 * | 3/2011 | Ono | 60/605.2 |
| 8,006,494 B2 * | 8/2011 | Nagae | 60/605.2 |
| 8,196,404 B2 * | 6/2012 | Onishi et al. | 60/605.2 |
| 8,220,443 B2 * | 7/2012 | Murata et al. | 60/605.2 |
| 2006/0021347 A1 * | 2/2006 | Sun et al. | 60/612 |
| 2010/0011762 A1 * | 1/2010 | Hokuto et al. | 60/602 |
| 2012/0240557 A1 * | 9/2012 | Kawaguchi et al. | 60/278 |
| 2012/0317958 A1 * | 12/2012 | Karcher | 60/273 |
| 2013/0118166 A1 * | 5/2013 | Bjorge et al. | 60/605.2 |
| 2013/0125542 A1 * | 5/2013 | Hayakawa | 60/602 |
| 2013/0131953 A1 * | 5/2013 | Luft et al. | 60/602 |
| 2013/0167528 A1 * | 7/2013 | Schlund et al. | 60/612 |
| 2014/0076279 A1 * | 3/2014 | Livshiz et al. | 123/403 |
| 2014/0278009 A1 * | 9/2014 | Cowgill et al. | 701/105 |

FOREIGN PATENT DOCUMENTS

| | | | | |
|---|---|---|---|---|
| DE | 102010037186 A1 * | 12/2011 | | F02B 37/007 |
| FR | 2892460 A1 * | 4/2007 | | F02B 37/007 |
| JP | 07293262 A * | 11/1995 | | F02B 37/12 |

* cited by examiner

TURBO SPEED CONTROL FOR MODE TRANSITIONS IN A DUAL TURBO SYSTEM

FIELD

The present disclosure relates to dual turbo systems and more particularly to turbo speed control systems and methods in a dual turbo system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Increasing fuel economy is a desirable goal for auto manufacturers. Consumers desire high fuel economy without sacrificing performance. Turbocharging provides a method for increasing performance during demanding conditions while reducing the overall fuel economy of the vehicle since a smaller displacement engine can be used.

One type of turbocharging system is a parallel turbocharger. In such a system, two turbines are provided in parallel and are capable of running simultaneously. In one mode of operation one turbine is spinning (on) while the other is not spinning (off). This mode will be referred to as single turbocharger mode. In another mode of operation both the turbines are spinning. This will be referred to as dual turbocharger mode. Providing a smooth transition between the modes is important for drivability of the vehicle.

SUMMARY

A system for controlling an engine is presented. The engine has a first turbocharger, a second turbocharger and a cutoff valve that regulates exhaust flow through a turbine of the second turbocharger. The system comprises a speed determination module and a boost control module. The speed determination module determines a current speed of the first turbocharger determines a current speed of the second turbocharger and determines a target speed of the second turbocharger based on the current speed of the first turbocharger. The boost control module compares the target speed of the second turbocharger with the current speed of the second turbocharger, and selectively adjusts a position of a cutoff valve to adjust the current speed of the second turbocharger based on the comparison.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts air and fuel within cylinders to generate drive torque. Some engines are turbocharged engines that include a turbine which forces more air into the combustion chamber than atmospheric pressure alone. Some engines are dual turbo engines that have two separate turbochargers operating in either a sequence or in parallel. In a sequential turbocharged engine, a first turbine operates at low speeds and a second turbine starts operating at a higher speed and load (e.g. a predetermined engine speed and load).

A first sub-set of cylinders output exhaust to a first exhaust pipe and a second sub-set of cylinders output exhaust to a second exhaust pipe. A first turbine of a first turbocharger is connected to the first exhaust pipe and a second turbine of a second turbocharger is connected to the second exhaust pipe. Compressors of the first and second turbochargers provide compressed air to the engine.

A crossover pipe is connected upstream of the first and second turbines. A first bypass valve regulates exhaust bypassing the first turbine and a second bypass valve regulates exhaust bypassing the second turbine. A cutoff valve is connected downstream of the second turbine and regulates exhaust flow through the second turbine and the second bypass valve.

Most parallel-turbocharged engines have two modes of operation: a single turbocharger mode and a dual turbocharger mode. In the single turbocharger mode, only one of the two turbochargers is active. For example, a cutoff valve located downstream of the turbine of the second turbocharger may be at least partially closed and/or the second compressor bypass valve may be at least partially open in the single turbocharger mode. In a dual turbocharger mode, both of the turbochargers are active.

Switching between the single turbocharger mode and the dual turbocharger mode abruptly can lead to a sudden jump and/or drop in the torque provided by the engine. Abrupt switches between the two modes can lead to a noticeable degradation in the drivability of the vehicle thereby providing a poor driving experience. For example, a sudden increase or decrease in torque can result in a jerk being felt by the driver and the passengers of the vehicle. The present disclosure provides methods and systems for smoothing the transition between the modes. Consequently, the switch between the modes is less noticeable, thereby increasing the drivability of the vehicle and providing an enhanced driving experience.

Figure 1:
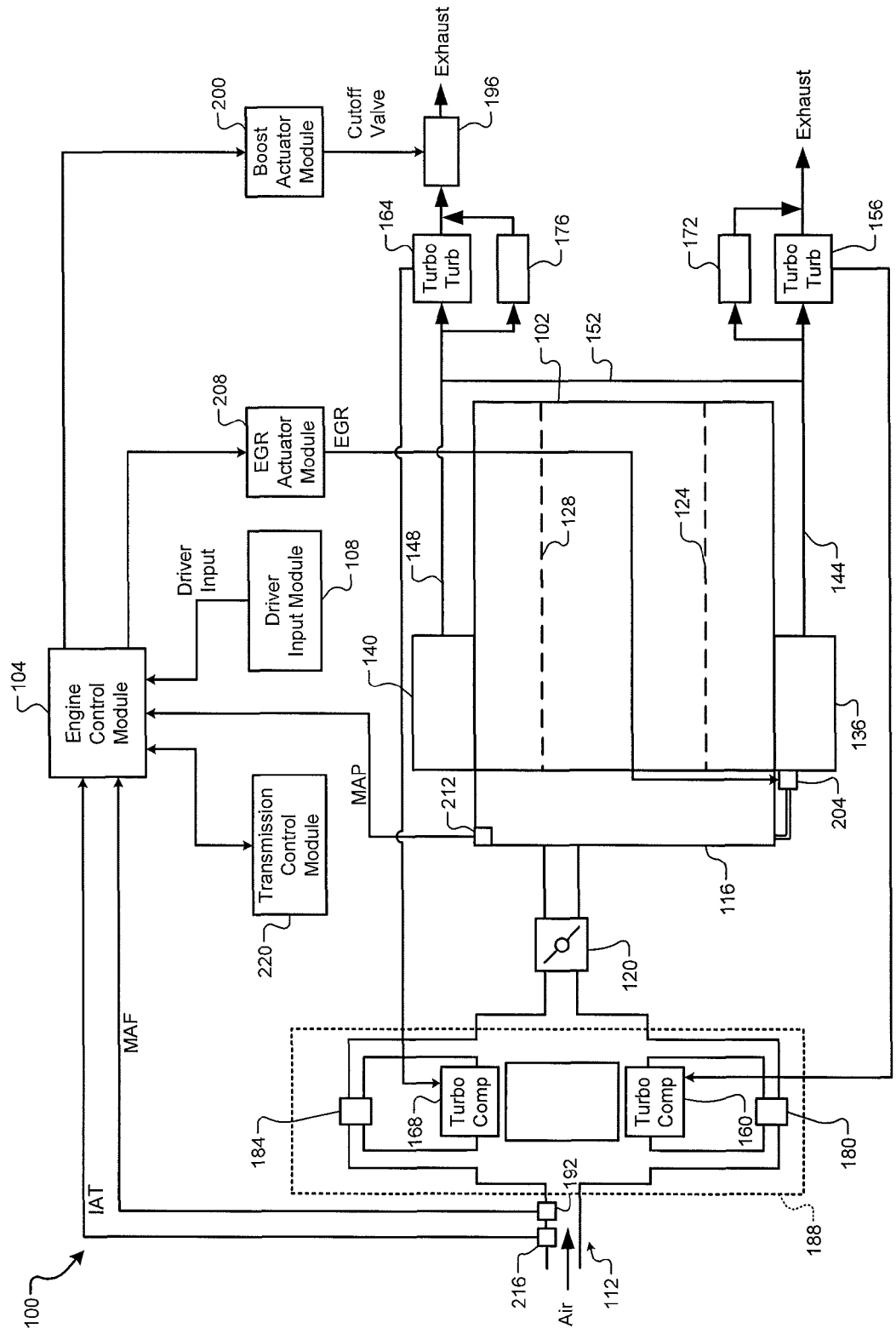
FIG. 1 is a functional block diagram of an example engine and exhaust system according to the present disclosure.

Referring now to FIG. 1, a functional block diagram of an example engine and exhaust system 100 is presented. The system 100 includes an engine 102 and an engine control module (ECM) 104. The engine control module (ECM) 104 controls the engine 102 that combusts an air/fuel mixture to produce drive torque for a vehicle. The ECM 104 controls the engine 102 based on driver input received from a driver input module 108. Air is drawn into the engine 102 through an intake system 112. For example only, the intake system 112 may include an intake manifold 116 and a throttle valve 120. For example only, the throttle valve 120 may include a butterfly valve having a rotatable blade. The ECM 104 controls an opening of the throttle valve 120 to control the amount of air drawn into the intake manifold 116.

Air from the intake manifold 116 is drawn into cylinders (not shown) of the engine 102. The engine 102 may include multiple cylinders. For example only, the engine 102 may include 2, 3, 4, 5, 6, 8, 10, and/or 12 cylinders. Under some circumstances, the ECM 104 may selectively deactivate one or more of the cylinders, which may improve fuel economy under certain engine operating conditions.

The engine 102 may operate using a four-stroke cycle. The four strokes are named the intake stroke, the compression stroke, the combustion stroke, and the exhaust stroke. During each revolution of a crankshaft (not shown), two of the four strokes occur within the cylinder. Therefore, two crankshaft revolutions are necessary for the cylinder to experience all four of the strokes.

The injected fuel mixes with air and creates an air/fuel mixture in the cylinder. During the compression stroke, a piston (not shown) within the cylinder compresses the air/fuel mixture. The engine 102 may be a compression-ignition engine, in which case compression in the cylinder ignites the air/fuel mixture. Alternatively, the engine 102 may be a spark-ignition engine, in which case a signal from the ECM 104 energizes a spark plug in the cylinder, which ignites the air/fuel mixture. The timing of the spark may be specified relative to the time when the piston is at its topmost position, referred to as top dead center (TDC).

The timing of the spark may be controlled by a timing signal specifying how far before or after TDC to generate the spark. Because piston position is directly related to crankshaft rotation, spark timing may be synchronized with the crankshaft angle. In various implementations, spark to deactivated cylinders may be halted.

The engine 102 may have two banks of cylinders. A first bank 124 of cylinders of the engine 102 outputs exhaust to a first exhaust manifold 136. A second bank 128 of cylinders of the engine 102 outputs exhaust to a second exhaust manifold 140.

The first exhaust manifold 136 outputs the exhaust from the first bank 124 of cylinders to a first exhaust pipe 144. The second exhaust manifold 140 outputs the exhaust from the second bank 128 of cylinders to a second exhaust pipe 148. A crossover pipe 152 is connected between the first and second exhaust pipes 144 and 148. Exhaust can flow from the first exhaust pipe 144 to the second exhaust pipe 148 through the crossover pipe 152 and vice versa.

The system 100 includes first and second turbochargers that provide pressurized air to the intake manifold 116. The first and second turbochargers may be single scroll turbochargers. The first turbocharger includes a first turbine 156 and a first compressor 160. The second turbocharger includes a second turbine 164 and a second compressor 168. Exhaust flow through the first turbine 156 drives the first turbine 156, and exhaust flow through the second turbine 164 drives the second turbine 164. A first turbine bypass valve 172 (or wastegate) may enable exhaust to bypass the first turbine 156. A second turbine bypass valve 176 (or wastegate) may enable exhaust to bypass the second turbine 164.

The first and second turbines 156 and 164 are located downstream of the locations where the crossover pipe 152 joins the first and second exhaust pipes 144 and 148. In other words, the crossover pipe 152 is connected between the first and second exhaust pipes 144 and 148 upstream of the first and second turbines 156 and 164.

The first turbine 156 is mechanically coupled to the first compressor 160, and the first turbine 156 drives rotation of the first compressor 160. The first compressor 160 provides compressed air to the throttle valve 120. A first compressor bypass valve 180 may enable air to bypass the first compressor 160. The second turbine 164 is mechanically coupled to the second compressor 168, and the second turbine 164 drives rotation of the second compressor 168. The second compressor 168 also provides compressed air to the throttle valve 120. A second compressor bypass valve 184 may enable air to bypass the second compressor 168. The first and second compressors 160 and 168, the first and second compressor bypass valves 180 and 184, and associated tubing is collectively illustrated by 188. In various implementations, a MAF sensor 192 may be located upstream of the first and second compressors 160 and 168. Additionally, one MAF sensor may be provided for each bank of cylinders.

A cutoff valve 196 is actuatable to vary exhaust flow through the cutoff valve 196. When the cutoff valve 196 is actuated to cut off exhaust flow, the exhaust from the second bank of cylinders is directed to the first exhaust pipe 144 through the crossover pipe 152. The cutoff valve 196 may be actuated to cut off exhaust flow, for example, to reduce or prevent exhaust flow through the second turbine 164. Reducing exhaust flow through the second turbine 164 reduces the output of the second compressor 168.

The ECM 104 may control boost (e.g., amount of intake air compression) provided by the first and/or second turbochargers via a boost actuator module 200. More specifically, the ECM 104 may control the cutoff valve 196, the first and second turbine bypass valves 172 and 176, and/or the first and second compressor bypass valves 180 and 184 via the boost actuator module 200. For example, the boost actuator module 200 may control duty cycle or position of the first turbine bypass valve 172, the second turbine bypass valve 176, the first compressor bypass valve 180, the second compressor bypass valve 184, and the cutoff valve 196 to control boost provided by the first and second turbochargers.

The system 100 may also include an exhaust gas recirculation (EGR) valve 204 that selectively redirects exhaust gas back to the intake manifold 116. An EGR actuator module 208 may control the EGR valve 204 based on signals from the ECM 104.

A pressure within the intake manifold 116 may be measured using a manifold absolute pressure (MAP) sensor 212. In various implementations, engine vacuum, which may refer to a difference between ambient air pressure and the pressure within the intake manifold 116, may be measured. A mass flow rate of air flowing into the intake manifold 116 may be measured using a mass air flow (MAF) sensor 192. In various implementations, the MAF sensor 192 may be located in a housing that also includes the throttle valve 120.

An ambient temperature of air being drawn into the engine 102 may be measured using an intake air temperature (IAT) sensor 216. A pressure within the cylinder may be measured using a cylinder pressure sensor. A cylinder pressure sensor may be provided for each cylinder. The ECM 104 may use signals from the sensors to make control decisions for the engine system.

The ECM 104 may communicate with a transmission control module 220 to coordinate shifting gears in a transmission (not shown). For example, the ECM 104 may reduce engine torque during a gear shift. The ECM 104 may communicate with a hybrid control module to coordinate operation of the engine 102 and an electric motor.

A manifold absolute pressure (MAP) sensor or a mass air flow (MAF) sensor may be placed at the inlet of the first compressor 160 and/or the second compressor 168 to measure the inlet pressure of the first compressor 160 and/or the second compressor 168, respectively. Another MAP or MAF sensor may be placed at the outlet of the first compressor 160 and/or the second compressor 168 to measure an outlet pressure of the first compressor 160 and/or the second compressor 168, respectively. The MAF sensors may be used to measure an amount of mass air flow provided by the first turbocharger and/or the second turbocharger.

The ECM 104 is configured to facilitate a smoother transition between the single turbocharger mode and the dual turbocharger mode according to the principles of the present disclosure, as described below.

Figure 2:
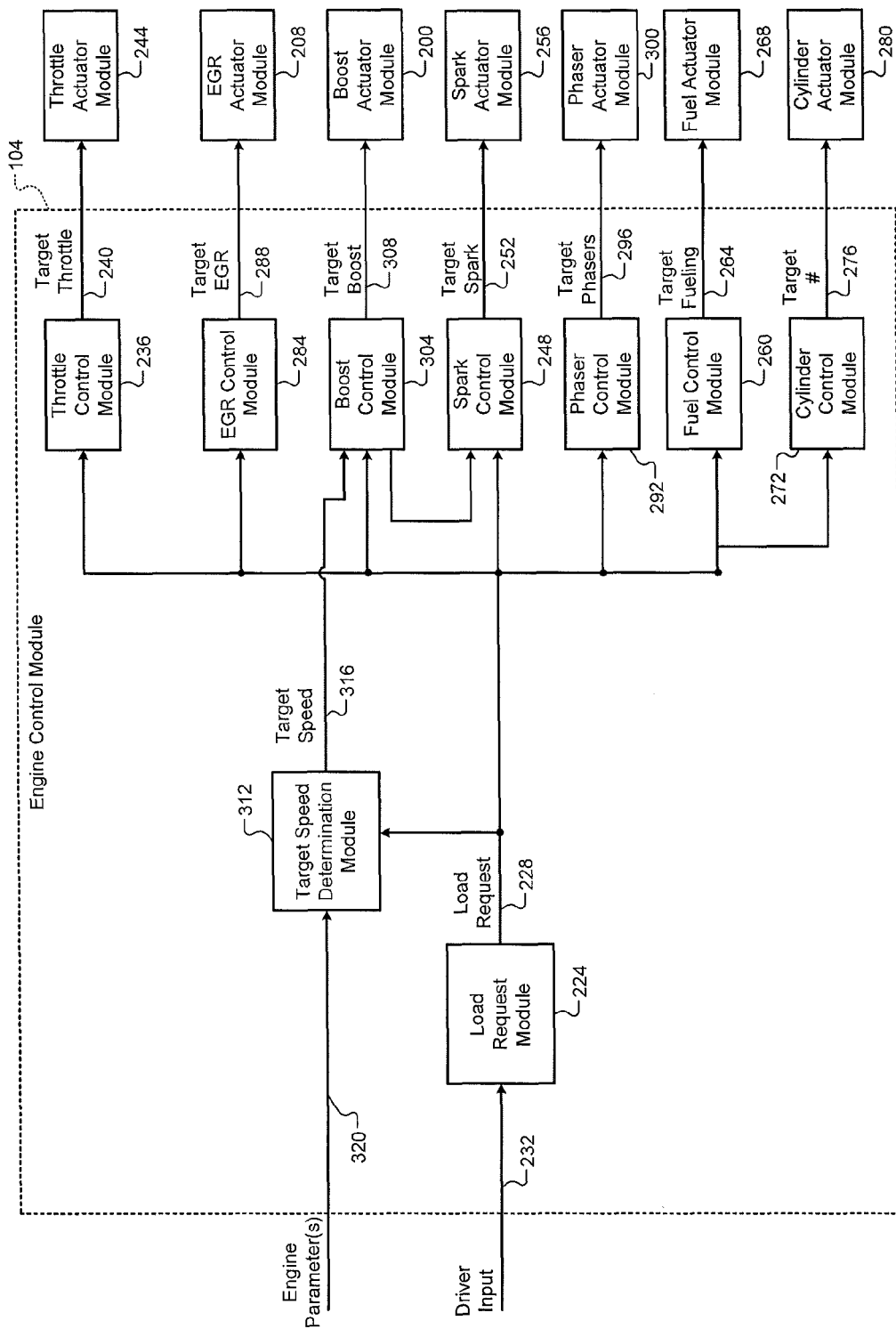
FIG. 2 is a functional block diagram of an example engine control module according to the present disclosure.

Referring now to FIG. 2, a functional block diagram of an example implementation of the ECM 104 is presented. A load request module 224 may determine a load request 228 based on one or more driver inputs 232, such as an accelerator pedal position, a brake pedal position, a cruise control input, and/or one or more other suitable driver inputs. The load request module 224 may determine the load request 228 additionally or alternatively based on one or more other load requests, such as torque requests generated by the ECM 104 and/or torque requests received from other modules of the vehicle, such as the transmission control module 220, the hybrid control module, a chassis control module, etc. One or more engine actuators may be controlled based on the load request 228 and/or one or more other vehicle operating parameters.

For example, a throttle control module 236 may determine a target throttle opening 240 based on the load request 228. A throttle actuator module 244 may adjust opening of the throttle valve 120 based on the target throttle opening 240. A spark control module 248 may determine a target spark timing 252 based on the load request 228. A spark actuator module 256 may generate spark based on the target spark timing 252.

A fuel control module 260 may determine one or more target fueling parameters 264 based on the load request 228. For example, the target fueling parameters 264 may include number of fuel injection pulses (per combustion event), timing for each pulse, and amount for each pulse. A fuel actuator module 268 may inject fuel based on the target fueling parameters 264.

A cylinder control module 272 may determine a target number of cylinders to deactivate and/or deactivate 276 based on the load request 228. A cylinder actuator module 280 may activate and deactivate cylinders of the engine 102 based on the target number 276. An EGR control module 284 may determine a target EGR opening 288 for the EGR valve 204 based on the load request 228. The EGR actuator module 208 may control the EGR valve 204 based on the target EGR opening 288.

A phaser control module 292 may determine target phaser positions 296 for intake and exhaust camshafts. A phaser actuator module 300 controls phasing of the intake and exhaust camshafts via intake and exhaust cam phasers based on the target phaser positions 296.

A boost control module 304 may determine a target boost 308 based on the load request 228. The boost actuator module 200 may control the cutoff valve 196 based on the target boost 308. The boost actuator module 200 may, for example, determine a target position for the cutoff valve 196 based on the target boost 308 and control the cutoff valve 196 based on the target position. Additionally or alternatively, the boost actuator module 200 may determine a target duty cycle based on the target boost 308 and apply a pulse width modulation (PWM) signal to the cutoff valve 196 based on the target duty cycle. The boost actuator module 200 may additionally or alternatively determine target positions for the first and second turbine bypass valves 172 and 176 based on the target boost 308 and control the first and second turbine bypass valves 172 and 176 based on the target positions, respectively. When the cutoff valve 196 is closed, the boost actuator module 200 may open the second compressor bypass valve 184.

In various implementations, the cutoff valve 196 may be a two-position device, and the boost actuator module 200 may determine whether to open the cutoff valve 196 to a predetermined open position or to close the cutoff valve 196 to a predetermined closed position based on the target boost 308. The boost actuator module 200 may open the cutoff valve 196 to the predetermined open position or close the cutoff valve 196 to the predetermined closed position based on the determination.

A target speed determination module 312 may determine a target speed 316 for the second turbine 164 (i.e. the second turbocharger) using an engine parameter 320. The engine parameter 320 may include a first value representing a first current speed of the first turbine 156 and an estimated speed of the first turbine 156 and the second turbine 164 in dual turbocharger mode. The engine parameter 320 may include value(s) representing one or more of an inlet pressure of the first compressor 160, an outlet pressure of the first compressor 160, an inlet pressure of the second compressor 168 and an outlet pressure of the second compressor 168. The engine parameter 320 may also include a value representing a position of one or more of the first turbine bypass valve 172, the first compressor bypass valve 180, the second turbine bypass valve 176, the second compressor bypass valve 184 and the cutoff valve 196. The engine parameter 320 may also include an engine speed, for example in revolutions per minute (RPM), that may be generated based on the position of the crankshaft.

In an alternative embodiment, the target speed determination module 312 may compute a first difference between the estimated speed of the first turbocharger in dual turbocharger mode and the speed of the first turbocharger in single turbocharger mode (i.e. speed of the first turbine 156). Then the target speed determination module 312 may select a target speed 316 for the second turbocharger such that a second difference between the target speed 316 and the estimated speed of the first turbocharger in dual turbocharger mode is equal to the first difference.

In another alternative embodiment, the target speed determination module 312 may select a target speed 316 for the second turbocharger such that the values of compressor inlet pressure and/or the compressor outlet pressure for the first compressor 160 and/or the second compressor 168 remain within certain predefined ranges and do not go below the lower bound limit of the range or above the upper bound limit of the range. The target speed determination module 312 may determine the target speed 316 for the second turbocharger using a lookup table that specifies specific target speeds based on the compressor inlet and/or the compressor outlet pressure.

In another alternative embodiment, the target speed determination module 312 may determine the target speed 316 using a lookup table that specifies the target speed 316 based on the speed of the first turbocharger (i.e., the speed of the first turbine 156), the estimated speed of the first and second turbochargers in dual turbocharger mode (i.e., the estimated speed of the first turbine 156 and the second turbine 164), and/or any other engine parameter 320.

The target speed determination module 312 provides the target speed 316 to the boost control module 304. The boost control module 304 compares the target speed 316 of the second turbocharger with a current speed of the second turbocharger. If the current speed of the second turbocharger is equal to the target speed 316, then the boost control module 304 maintains the current position of the cutoff valve 196, the first turbine bypass valve 172 and the second turbine bypass valve 176.

If the current speed of the second turbocharger is less than the target speed 316, then the boost control module 304 opens the cutoff valve 196 to increase the speed of the second turbocharger. Opening the cutoff valve 196 allows more exhaust to flow through the second turbine 164 which increases the speed of the second turbocharger. The boost control module 304 may close the first turbine bypass valve 172 and/or the second turbine bypass valve 176 to keep exhaust gas flow through the first turbine 156 unchanged. When the exhaust gas flow through the first turbine 156 is unchanged, the speed of the first turbine 156 remains unchanged and the first compressor 160 compresses and feeds the same amount of air into the engine 102 resulting in an unchanged boost.

If the current speed of the second turbocharger is greater than the target speed 316, then the boost control module 304 closes the cutoff valve 196 to decrease the speed of the second turbocharger. Closing the cutoff valve 196 decreases the amount of exhaust that flows through the second turbine 164 which decreases the speed of the second turbocharger. The boost control module 304 may open the first turbine bypass valve 172 and/or the second turbine bypass valve 176 to keep exhaust gas flow through the first turbine 156 unchanged. When the exhaust gas flow through the first turbine 156 is unchanged, the speed of the first turbine 156 remains unchanged and the first compressor 160 compresses and feeds the same amount of air into the engine 102 resulting in an unchanged boost.

The boost control module 304 may close the second compressor bypass valve 184 when the current speed of the second turbocharger is less than the target speed 316 in order to increase the speed of the second turbocharger. Closing the second compressor bypass valve 184 decreases the load on the second compressor 168.

The boost control module 304 may control a position of the first turbine bypass valve 172 and/or the second turbine bypass valve 176 to achieve a target boost. The boost control module 304 compares a current boost with the target boost.

If the current boost is less than the target boost, then the boost control module 304 closes the first turbine bypass valve 172. Closing the first turbine bypass valve 172 forces more exhaust to go through the first turbine 156 causing the first turbine 156 to spin faster. A faster spinning first turbine 156 causes the first compressor 160 to compress more air and feed more compressed air into the engine 102. More compressed air being fed into the engine 102 results in more boost. The boost control module 304 may close the second turbine bypass valve 176 and/or the cutoff valve 196 to further increase the boost.

If the current boost is greater than the target boost, then the boost control module 304 opens the first turbine bypass valve 172. Opening the first turbine bypass valve 172 allows exhaust to bypass the first turbine 156 causing the first turbine 156 to spin slower. A slower spinning first turbine 156 causes the first compressor 160 to compress less air and feed less compressed air into the engine 102. Less compressed air being fed into the engine 102 results in a lesser boost. The boost control module 304 may open the second turbine bypass valve 176 and/or the cutoff valve 196 to further decrease the boost.

Figure 3:
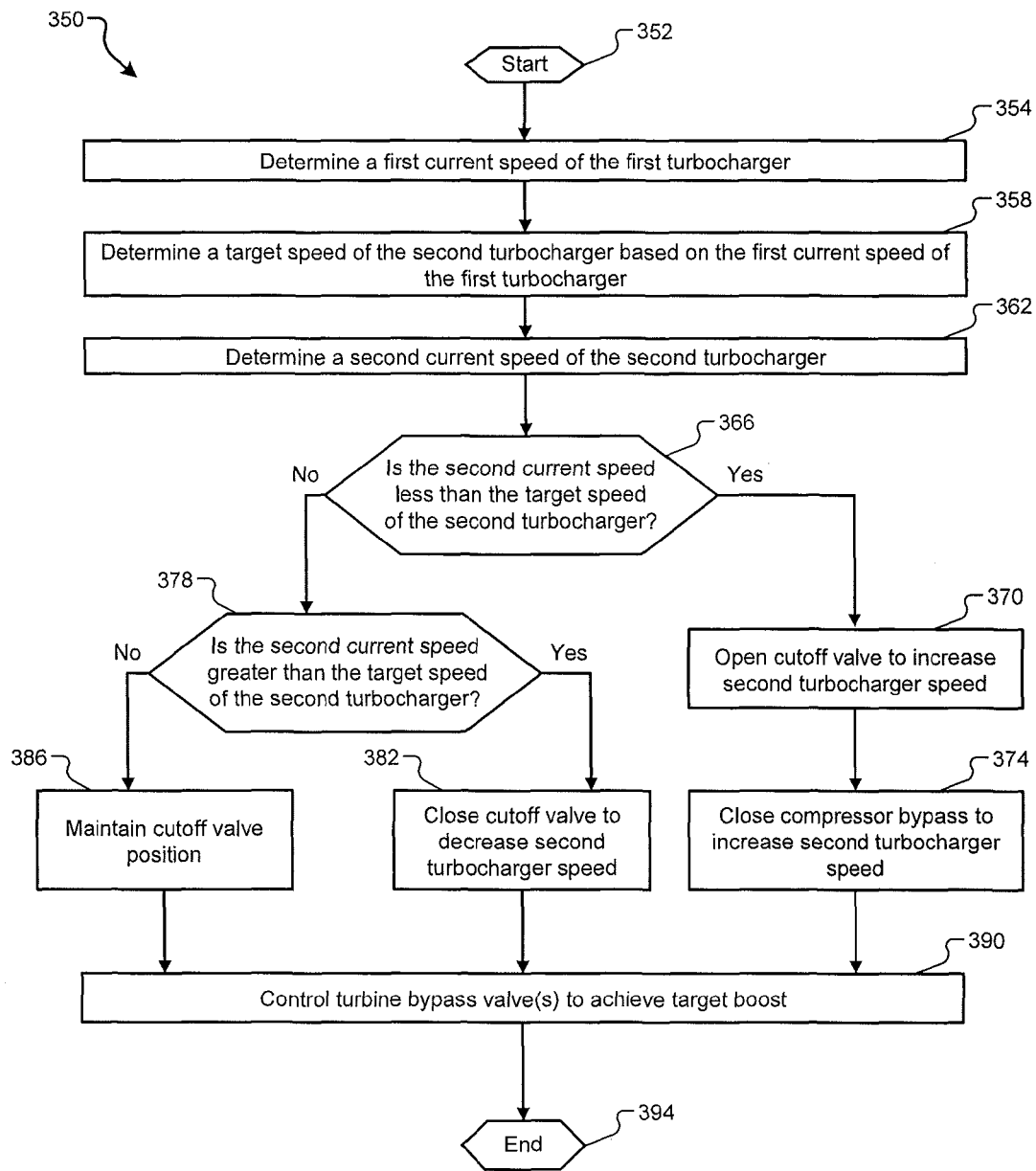
FIG. 3 is a flowchart depicting an example method of controlling the speed of a turbocharger in a dual turbo system according to the present disclosure.

Referring now to FIG. 3, an example method 350 for controlling the speed of a turbocharger in a dual turbo system begins at 352.

At 354, the method 350 determines a first current speed of the first turbocharger. The first current speed of the first turbocharger may be determined by using a sensor to measure the current speed at which the first turbine 156 is rotating. Alternatively, the sensor may measure the current speed at which the first compressor 160 is rotating or the speed at which a shaft connected with the first turbine 156 is rotating. Alternatively, the first current speed of the first turbocharger may be estimated, for example, based on the pressure across and air flow through the first compressor 160 and/or any other engine parameter 320. A lookup table may be used to determine the current speed of the first turbocharger based on a known pressure across and air flow through the first compressor 160 and/or any other engine parameter 320.

At 358, the method 350 determines a target speed 316 of the second turbocharger based on the first current speed of the first turbocharger. The target speed 316 may be determined in any of the ways described above.

At 362, the method 350 determines a second current speed of the second turbocharger. The second current speed of the second turbocharger may be measured or estimated, similar to the manner in which the first current speed of the first turbocharger is determined, as described above.

At 366, the method 350 compares the target speed 316 of the second turbocharger with the second current speed of the second turbocharger. For example, the boost control module 304 determines whether the second current speed is less than the target speed 316 of the second turbocharger.

If the second current speed is less than the target speed 316 of the second turbocharger, then, at 370, the method 350 opens a cutoff valve 196 to increase the second turbocharger speed. At 374, the method 350 closes the second compressor bypass valve 184 to further increase the second turbocharger speed.

If, however, the second current speed is not less than the target speed 316 of the second turbocharger, then, at 378, the method 350 determines whether the second current speed is greater than the target speed 316 of the second turbocharger.

If the second current speed is greater than the target speed 316 of the second turbocharger, then, at 382, the method 350 closes the cutoff valve 196 to decrease the second current speed of the second turbocharger.

If the second current speed of the second turbocharger is neither greater nor less than the target speed 316 of the second turbocharger, then the current speed of the second turbocharger must be equal to the target speed 316 of the second turbocharger. In this scenario, the method 350 maintains the position of the cutoff valve 196, at 386, in order to maintain the speed of the second turbocharger.

At 390, the method 350 controls a position of the first turbine bypass valve 172 and/or the second turbine bypass valve 176 to achieve a target boost. The method 350 ends at 394.

Figure 4:
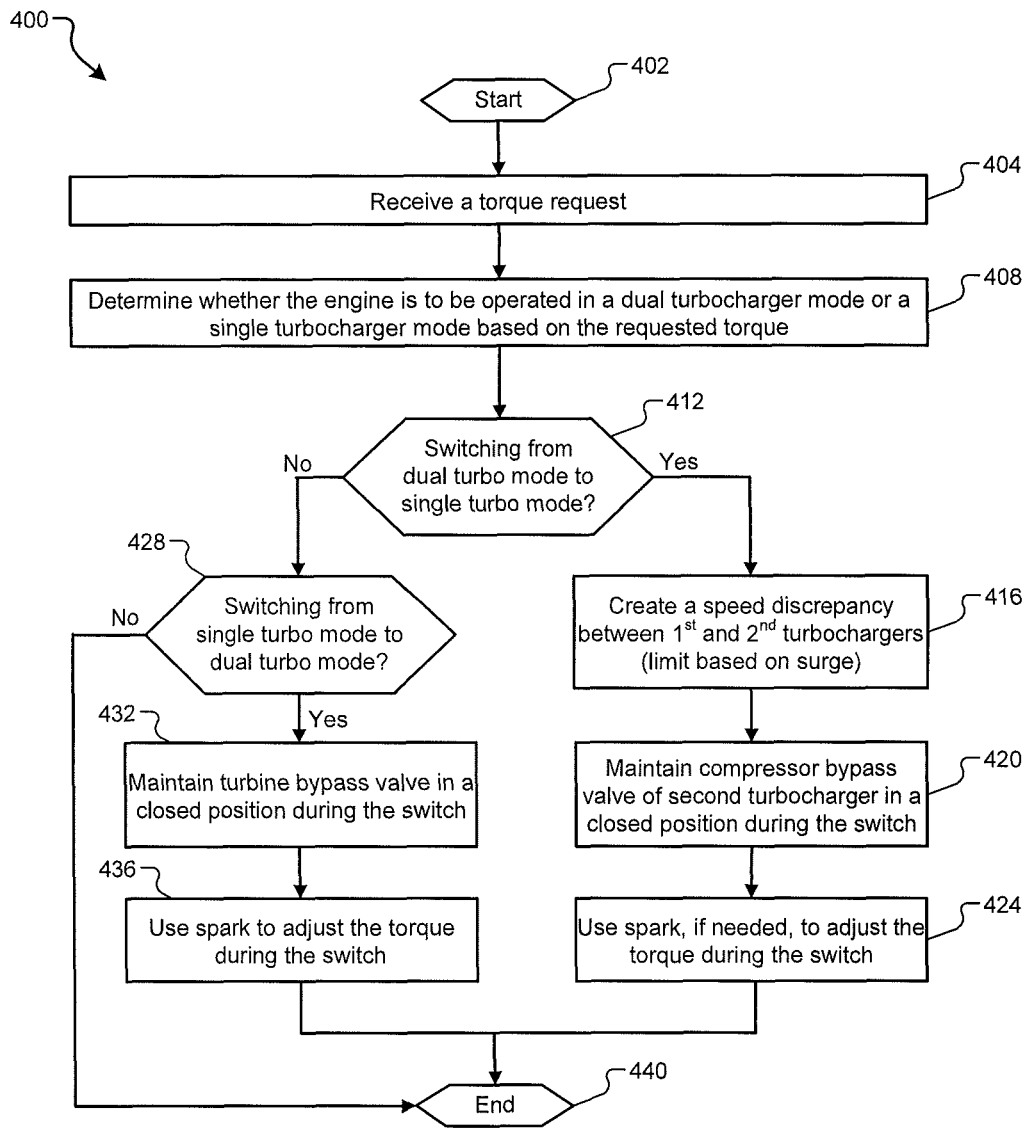
FIG. 4 is a flowchart depicting another example method of controlling the speed of a turbocharger in a dual turbo system according to the present disclosure.

Referring now to FIG. 4, another example method 400 of controlling the speed of a turbocharger in a dual turbo system begins at 402.

At 404, the method 400 receives a load request 228, for example from the load request module 224. The load request 228 specifies a value indicating an amount of torque requested based on a driver input.

At 408, the method 400 determines whether the engine 102 is to be operated in the dual turbocharger mode or the single turbocharger mode in order to produce the requested torque. If the requested torque exceeds the engine torque capacity in single turbocharger mode, then the engine 102 is to be operated in the dual turbocharger mode. However, if the requested torque can be produced by the engine with only the first turbocharger being active, then the engine 102 is to be operated in the single turbocharger mode.

At 412, the method 400 determines whether the engine 102 is being switched from the dual turbocharger mode to the single turbocharger mode. The method 400 may determine the current mode of operation of the engine 102 by determining whether the second turbocharger is active. If the second turbocharger is active then the engine 102 is operating in the dual turbocharger mode.

If the engine 102 is to be switched from the dual turbocharger mode to the single turbocharger mode, then, at 416, the method 400 creates a discrepancy between the speeds of the first and second turbochargers.

The method 400 may create the speed discrepancy between the first and second turbochargers by increasing the speed of the first turbocharger. The method 400 increases the speed of the first turbocharger, so that the first turbocharger is closer to the speed at which the first turbocharger will operate in the single turbocharger mode. The method 400 may increase the speed of the first turbocharger mode by closing the cutoff valve 196.

In an alternative embodiment, the method 400 may create the speed discrepancy between the first and second turbochargers by decreasing the speed of the second turbocharger. The method 400 decreases the speed of the second turbocharger, so that the second turbocharger is closer to a speed of zero. The method 400 may decrease the speed of the second turbocharger by closing the cutoff valve 196.

While the engine 102 is being switched from the dual turbocharger mode to the single turbocharger mode, the method 400 maintains the second compressor bypass valve 184 in a closed position, at 420. The second compressor bypass valve 184 is maintained in the closed position, so that the second compressor 168 can continue to supply air to the engine 102. Advantageously, by holding the second compressor bypass valve 184 closed, more energy is extracted from the second turbocharger while the first turbocharger is ramping up.

The method 400 determines whether spark is needed to adjust the torque during the switch from the dual turbocharger mode to the single turbocharger mode. If spark is needed during the switch then, the method 400 provides spark in order to fulfill the requested torque, at 424. The method 400 creates a spark reserve in advance to compensate for a potential spark advance capability loss due to an increase in the engine backpressure in the single turbocharger mode.

If the engine 102 is not being switched from the dual turbocharger mode to the single turbocharger mode, then the method 400 determines whether the engine is being switched from the single turbocharger mode to the dual turbocharger mode, at 428.

If the engine 102 is being switched from the single turbocharger mode to the dual turbocharger mode, the method 400 maintains the current position of the first turbine bypass valve 172 or closes the first turbine bypass valve 172 and opens the cutoff valve 196 during the switch, at 432. The first turbine bypass valve 172 is maintained in the current position or continues to be closed until the second turbocharger is ramped up. Once the second turbocharger is up to speed, the method 400 may open the first turbine bypass valve 172 to maintain the speed of or slow down the first turbocharger.

At 436, the method 400 determines whether spark is needed to adjust the torque during the switch. If spark is needed, then the method 400 uses spark to adjust the torque, so that the output torque is equal to the requested torque.

The method 400 compares the output torque of the engine 102 with the requested torque. If the output torque is less than the requested torque, then the method 400 uses spark advance to increase the output torque of the engine 102. If the output torque is greater than the requested torque, then the method 400 uses spark retard to decrease the output torque of the engine 102. The method 400 ends at 440.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system for controlling an engine having a first turbocharger, a second turbocharger and a cutoff valve that regulates exhaust flow through a turbine of the second turbocharger, the system comprising:
   a speed determination module that
      determines a current speed of the first turbocharger,
      determines a current speed of the second turbocharger, and determines a target speed of the second turbocharger based on the current speed of the first turbocharger; and a boost control module that compares the target speed of the second turbocharger with the current speed of the second turbocharger, and that selectively adjusts a position of a cutoff valve to adjust the current speed of the second turbocharger based on the comparison.

2. The system of claim 1, wherein the speed determination module determines the target speed of the second turbocharger by:
    determining a speed of the first turbocharger in a dual turbocharger mode;
    computing a first difference between the speed of the first turbocharger in a dual turbocharger mode and a speed of the first turbocharger in a single turbocharger mode; and
    selecting the target speed such that a second difference between the target speed of the second turbocharger and the speed of the first turbocharger in the dual turbocharger mode is equal to the first difference between the speed of the first turbocharger in the dual turbocharger mode and the speed of the first turbocharger in the single turbocharger mode.

3. The system of claim 1, wherein the speed determination module determines the target speed of the second turbocharger by:
    determining one or more of a compressor inlet pressure, a compressor outlet pressure, a turbine bypass valve position and the cutoff valve position; and
    selecting the target speed of the second turbocharger based on one or more of the compressor inlet pressure, the compressor outlet pressure, the turbine bypass valve position and the cutoff valve position.

4. The system of claim 1, wherein the boost control module selectively adjusts the position of the cutoff valve by opening the cutoff valve in response to the current speed of the second turbocharger being less than the target speed of the second turbocharger.

5. The system of claim 1, wherein the boost control module selectively adjusts the position of the cutoff valve by closing the cutoff valve in response to the current speed of the second turbocharger being greater than the target speed of the second turbocharger.

6. The system of claim 1, wherein the boost control module selectively adjusts the position of the cutoff valve by maintaining the position of the cutoff valve in response to the current speed of the second turbocharger being equal to the target speed of the second turbocharger.

7. The system of claim 1, wherein the boost control module is further configured to close a compressor bypass valve in response to the current speed of the second turbocharger being less than the target speed of the second turbocharger.

8. The system of claim 1, wherein the boost control module is further configured to control a position of a turbine bypass valve to achieve a target boost.

9. The system of claim 1, wherein the engine is being switched from a single turbocharger operating mode to a dual turbocharger operating mode.

10. A method for controlling an engine having a first turbocharger and a second turbocharger, the method comprising:
    determining a current speed of the first turbocharger;
    determining a target speed of the second turbocharger based on the current speed of the first turbocharger;
    determining a current speed of the second turbocharger;
    comparing the target speed of the second turbocharger with the current speed of the second turbocharger; and
    selectively adjusting a position of a cutoff valve to adjust the current speed of the second turbocharger based on the comparison, wherein the cutoff valve regulates exhaust flow through a turbine of the second turbocharger.

11. The method of claim 10, wherein determining the target speed of the second turbocharger comprises:
    determining a speed of the first turbocharger in a dual turbocharger mode;
    computing a first difference between the speed of the first turbocharger in a dual turbocharger mode and a speed of the first turbocharger in a single turbocharger mode; and
    selecting the target speed such that a second difference between the target speed of the second turbocharger and the speed of the first turbocharger in the dual turbocharger mode is equal to the first difference between the speed of the first turbocharger in the dual turbocharger mode and the speed of the first turbocharger in the single turbocharger mode.

12. The method of claim 10, wherein determining the target speed of the second turbocharger comprises:
    determining one or more of a compressor inlet pressure, a compressor outlet pressure, a turbine bypass valve position and the cutoff valve position; and
    selecting the target speed of the second turbocharger based on one or more of the compressor inlet pressure, the compressor outlet pressure, the turbine bypass valve position and the cutoff valve position.

13. The method of claim 10, wherein selectively adjusting the position of the cutoff valve comprises opening the cutoff valve in response to the current speed of the second turbocharger being less than the target speed of the second turbocharger.

14. The method of claim 10, wherein selectively adjusting the position of the cutoff valve comprises closing the cutoff valve in response to the current speed of the second turbocharger being greater than the target speed of the second turbocharger.

15. The method of claim 10, wherein selectively adjusting the position of the cutoff valve comprises maintaining the position of the cutoff valve in response to the current speed of the second turbocharger being equal to the target speed of the second turbocharger.

16. The method of claim 10, further comprising closing a compressor bypass valve in response to the current speed of the second turbocharger being less than the target speed of the second turbocharger.

17. The method of claim 10, further comprising controlling a position of a turbine bypass valve to achieve a target boost.

18. The method of claim 10, wherein the engine is being switched from a single turbocharger mode to a dual turbocharger mode.

19. A method for controlling an engine having a first turbocharger and a second turbocharger, the method comprising:
    receiving a load request;
    determining whether the engine is to be switched from a dual turbocharger mode to a single turbocharger mode based on the load request;
    creating a speed discrepancy between the first turbocharger and the second turbocharger in response to the engine being switched from the dual turbocharger mode to the single turbocharger mode; and
    maintaining a compressor bypass valve associated with a compressor of the second turbocharger in a closed position while the engine is being switched from the dual turbocharger mode to the single turbocharger mode.

20. The method of claim 19, wherein creating the speed discrepancy comprises closing a cutoff valve to decrease the speed of the second turbocharger, wherein the cutoff valve regulates exhaust flow through a turbine of the second turbocharger.

21. The method of claim 19, wherein creating the speed discrepancy comprises closing a first turbine bypass valve of the first turbocharger to increase the speed of the first turbocharger.

22. The method of claim 19, wherein creating the speed discrepancy comprises opening a second turbine bypass valve of the second turbocharger to decrease the speed of the second turbocharger.

23. The method of claim 19, further comprising opening the compressor bypass valve associated with the compressor of the second turbocharger when the engine has switched from the dual turbocharger mode to the single turbocharger mode.

24. The method of claim 19, further comprising creating a spark reserve before switching the engine from the dual turbocharger mode to the single turbocharger mode.

25. The method of claim 24, further comprising using the spark reserve during the switch from the dual turbocharger mode to the single turbocharger mode to adjust torque.

* * * * *